(12) United States Patent
Martins

(10) Patent No.: US 8,159,751 B2
(45) Date of Patent: Apr. 17, 2012

(54) APPARATUS FOR HEAD MOUNTED IMAGE DISPLAY

(76) Inventor: Miguel Marques Martins, Miraflores (PT)

(*) Notice: Subject to any disclaimer, the term of this patent is extended or adjusted under 35 U.S.C. 154(b) by 0 days.

(21) Appl. No.: 12/748,975

(22) Filed: Mar. 29, 2010

(65) Prior Publication Data

US 2010/0254017 A1    Oct. 7, 2010

(30) Foreign Application Priority Data

Apr. 5, 2009  (PT) .................. 20091000034336

(51) Int. Cl.
*G02B 27/14* (2006.01)
*G02F 1/1335* (2006.01)
*G09G 5/00* (2006.01)

(52) U.S. Cl. .............. 359/630; 359/634; 349/11; 345/7

(58) Field of Classification Search .......... 359/409–410, 359/462, 466, 638–639, 13–14, 603–636, 359/404, 407; 345/7, 9; 348/115; 353/11–12, 353/28, 119; 349/11; 340/438, 980, 995.1, 340/815.47, 815.74

See application file for complete search history.

(56) References Cited

U.S. PATENT DOCUMENTS

| 4,439,755 | A | | 3/1984 | LaRussa | |
|---|---|---|---|---|---|
| 5,381,263 | A | * | 1/1995 | Nowak et al. | 359/411 |
| 5,886,822 | A | * | 3/1999 | Spitzer | 359/630 |
| 6,011,653 | A | * | 1/2000 | Karasawa | 359/630 |
| 6,016,160 | A | | 1/2000 | Coombs | |
| 6,356,392 | B1 | | 3/2002 | Spitzer | |
| 2007/0171328 | A1 | * | 7/2007 | Freeman et al. | 349/65 |

FOREIGN PATENT DOCUMENTS

EP    0 825 470 A1    2/1998

* cited by examiner

*Primary Examiner* — Dawayne A Pinkney

(57) ABSTRACT

Image display device having an image source generating an image, a beam splitter positioned at forty five degrees to the main optical path, to project and focus the image generated by the image source into the entrance pupil of the human eye, two achromatic standard doublet lenses positioned perpendicularly to the main optical path and placed between the image source and the beam splitter, and configured to amplify, collimate, and correct optical aberrations of said image, wherein the image source, beam splitter and the doublet lenses are in an on-axis configuration and the image display device comprises two mounting brackets parallel to the main optical axis, each having an extremity part holding an edge of the beam splitter and the other extremity pivotally attached to a housing, allowing the brackets and beam splitter to rotate in an axis perpendicular to the main optical path.

15 Claims, 4 Drawing Sheets

402

APPARATUS FOR HEAD MOUNTED IMAGE DISPLAY

FIELD

The disclosed subject matter relates in general to image display devices. More particularly, this disclosure relates to a novel and improved apparatus for displaying images through a see-through head mounted display (HMD).

DESCRIPTION OF THE RELATED ART

Generally, see-through HMDs comprise a housing having therein an image source and a set of projection optical elements (e.g., lenses, mirrors, prisms and beam splitters), some of which are placed in front of the user's eyes. Different types of see-through HMDs are known from. Normally, see-through HMDs have an off-axis optical configuration which introduces significant optical aberrations that need to be accounted for and subsequently corrected. Additionally, the HMDs are less tolerant of misalignments in the optical elements.

In order to correct these optical aberrations, additional or custom-made optical elements are normally used (e.g., doublet lenses or aspheric lenses). The need for optimal alignment between all the optical elements requires very low error tolerances during the manufacturing of their supporting structures, normally the interior of the housing, in order to accurately accommodate the elements along the optical axes. Such complex supporting housing structures, and the difficulties encountered during assembly, tends to confer more costs on the HMD production process.

See-through HMDs are devices comprising several optical and non-optical elements, such as lenses, polarization beam splitters, apertures and quarter wave converters, therefore increasing the number of elements of the HMD. The apertures included in the optical configuration create additional diffractions and consequent interferences, thus decreasing the image quality. Moreover, these styles of devices generally have two optical components (the beam splitter and the retro-reflector screen) in front of the user's eyes, which influences and restricts the see-through capability of the device. All these additional elements in such off-axis configurations contribute to a bigger, heavier, and thus more uncomfortable device which is intended to be worn on the head. Being heavy and bulky, the device tends to become loose during wear. A more complex mechanical structure may be used to provide proper fixation of the device, but it also confers higher manufacturing costs.

SUMMARY

The following description is not to be taken in a limiting sense, but is made for the purpose of describing the general principles of the present disclosure. The scope of the present disclosure should be determined with reference to the claims.

The present disclosure relates to an image display device that can be used as a head mounted display (HMD). A specific category of HMDs are the see-through HMDs. These see-through HMDs allow the user to see virtual information in front of his or her eyes, which is at the same time superimposed to the real scenario without obstructing the user's field-of-view.

The HMD of the present disclosure may be used in several applications, such as maintenance, logistics, civil protection, search and rescue missions, retail services, professional services, government services, transportation, navigation and guidance systems, medical care operations, telecommunication services, navy, army soldiers, patrollers, troops, aeronautic, aerospace, astronaut activities, sports, industrial manufacturing, hardware testing, assembly, tourism, shopping, vehicle service, augmented reality, virtual reality, and other industries.

A technical advantage of the disclosed subject matter includes a greater error tolerance to optical misalignments. Because the optical elements of the disclosed subject matter are configured along the on-axis, main optical path, the optical configuration of the image display device does not compromise the resolution of images provided. Another advantage is that the optical configuration does not comprise apertures, so there are no additional diffractions of the image provided by the image source.

The present disclosure proposes to solve the above mentioned problems by the use of a device having an on-axis configuration with large tolerances to misalignments and one slim, discrete, removable, and adjustable COTS (commercial off-the-shelf) optical element positioned in front of the user's eyes.

These and other aspects of the disclosed subject matter, as well as additional novel features, will be apparent from the description provided herein. The intent of this summary is not to be a comprehensive description of the claimed subject matter, but rather to provide a short overview of some of the subject matter's functionality. Other features and advantages here provided will become apparent to one with skill in the art upon examination of the following FIGUREs and detailed description. It is intended that all such additional features and advantages that are included within this description, be within the scope of the accompanying claims.

BRIEF DESCRIPTIONS OF THE DRAWINGS

For a more complete understanding of the disclosed subject matter and advantages thereof, reference is now made to the following description taken in conjunction with the accompanying drawings in which like reference numbers indicate like features and wherein.

DETAILED DESCRIPTION OF THE SPECIFIC EMBODIMENTS

Figure 1:
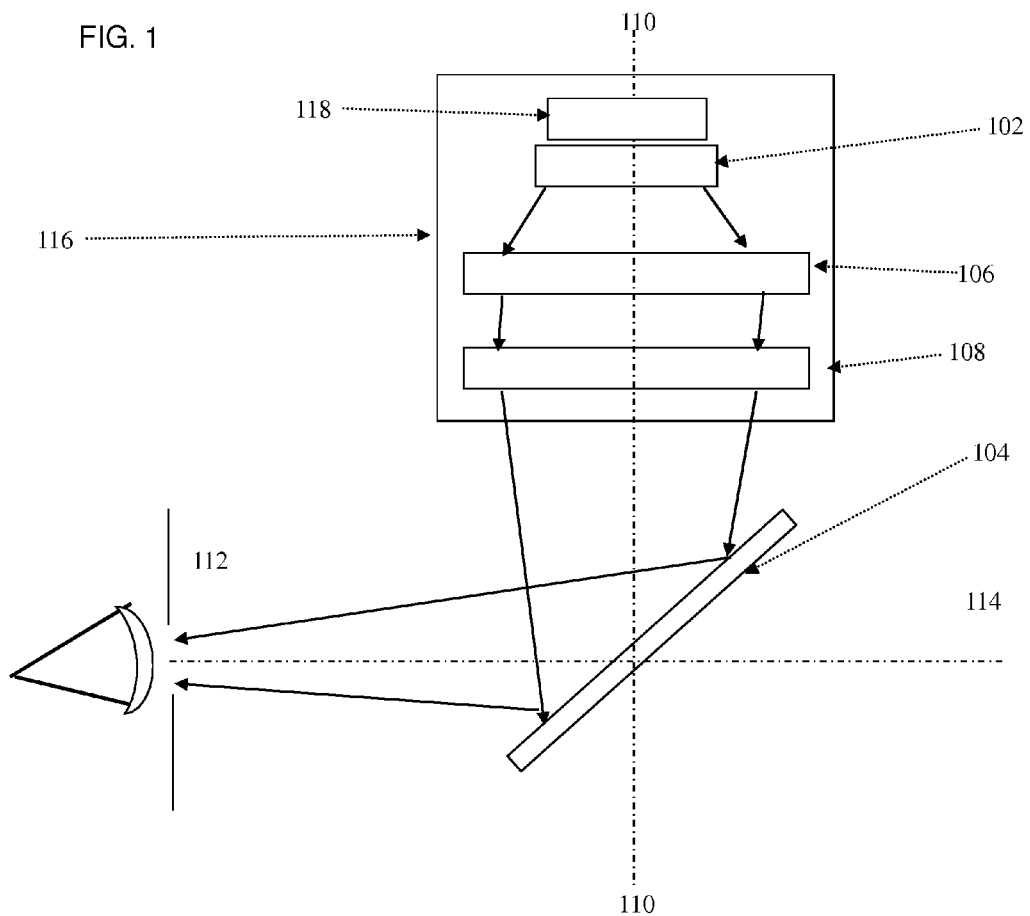
FIG. 1 depicts a schematic view of an optical configuration of an image display device according to the disclosed subject matter.

Preferred embodiments of the present disclosure are illustrated in the drawings, like numbers being used to refer to like and corresponding parts of the various drawings.

The following description is not to be taken in a limiting sense, but is made for the purpose of describing the general principles of the present disclosure. The scope of the present disclosure should be determined with reference to the claims.

FIG. 1 shows the optical configuration of the image display device according to the present disclosure. It comprises an image source 102, first 106 and second achromatic doublet lenses 108, a beam splitter 104, and housing 116. The image source 102 and the achromatic lenses 106, 108 and the beam splitter 104 define a main optical path 110, shown in FIG. 1 by the dashed line, and are disposed in an on-axis configuration since the mechanical center of each of these elements is coincident with the main optical path.

The image source 102 generates an image that will pass through the two achromatic lenses 106, 108 until it reaches the beam splitter 104 which is positioned preferably at 45° to the main optical path 110 projecting and focusing the image into the human's eye entrance pupil 112. Another optical path 114 can be defined as the path from the beam splitter 104 to the entrance pupil 112, shown in FIG. 1 by the dotted line.

The image source 102 and the two achromatic lenses 106, 108 are contained inside the housing 116. In the preferred embodiment, the image source 102 is an OLED micro-display with the highest image resolution SXGA (1280×1024 pixels) available within this type of micro display devices. However, it can be replaced by any other type of images source (e.g., LCD, CRT, LCOS, AMOLED, or other similar image sources). The image source 102 electrically connects to a driver electronics board 118. This driver electronics board 118 can be placed on the top of the image source 102, inside the housing 116, or outside the housing 116.

The two achromatic doublet lenses 106, 108 are perpendicularly positioned to the main optical path 110 and placed between the image source 102 and the beam splitter 104. Instead of the achromatic doublet lenses 106, 108, other types of lenses may be used as well (examples of which are set forth below). These types of lenses are configured to amplify, collimate and correct optical aberrations of the image provided by the image source 102. Although the device comprises at least one lens, the optical path length needs to be adapted according to the total number of lenses. The total number of lenses may exceed two. As an example, the image display device may include three lenses or even more than three lenses. Further, at least one achromatic doublet lenses may be used.

As an example, the lens set may include one achromatic doublet lens and two or three single lenses, or two achromatic doublet lenses and two single lenses. Alternatively, the lens set may include two aspheric custom made lenses. The possible lenses and combinations set forth as examples are not the only lenses or combinations available and those examples are not to be considered limiting in any way. In the preferred embodiment, the lenses are easily assembled in their correct position inside the housing 116 by means of a set of longitudinal (parallel to the main optical path) holders placed in slots formed at the internal periphery of the housing 116. The set of holders comprise abutting surfaces to confine and restrict the displacement of the lenses. In an alternative embodiment, the lenses could be held in proper alignment and their respective movement restricted by other styles and types of holders.

Figure 2A:
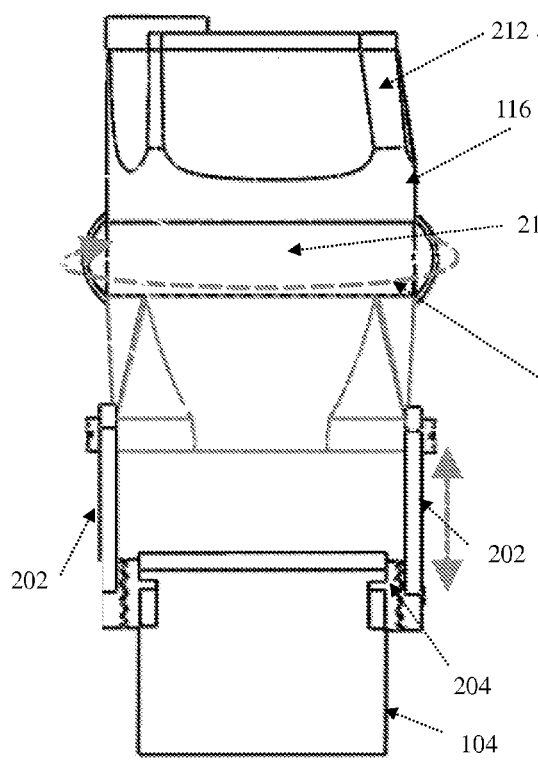
FIGS. 2A and 2B show, respectively, a front and side view of an exemplary housing of an image display device according to the disclosed subject matter.
Figure 2B:
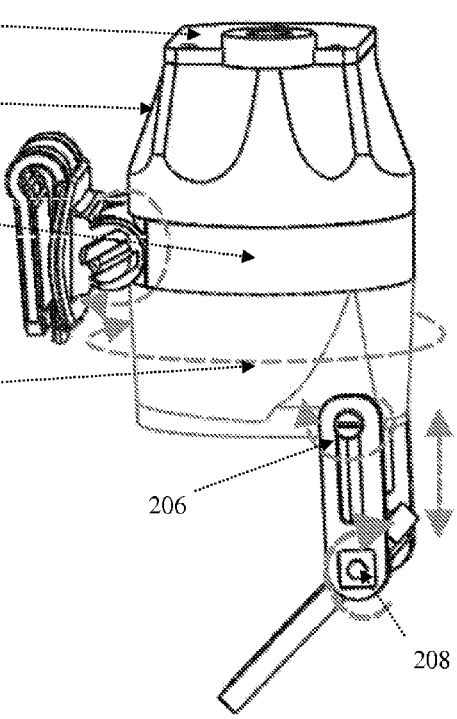

FIGS. 2A and 2B show, respectively, the front and side view of the housing 116 of the image display device according of the present disclosure.

As can be seen from these figures, on the top of housing 116, there is a cap 212 with a small slot to pass an electrical cable (not shown) to transmit the image signal, the electrical power and the control functions. This cap 212 seals the top part of the housing 116 by use of screws or any other known mechanical fixation means. An opening is formed on the cap 212 to access a vertical adjusting mechanism (not shown) (parallel to the main optical axis) adapted to move the image source in two different directions (generally up and down).

Figure 3:
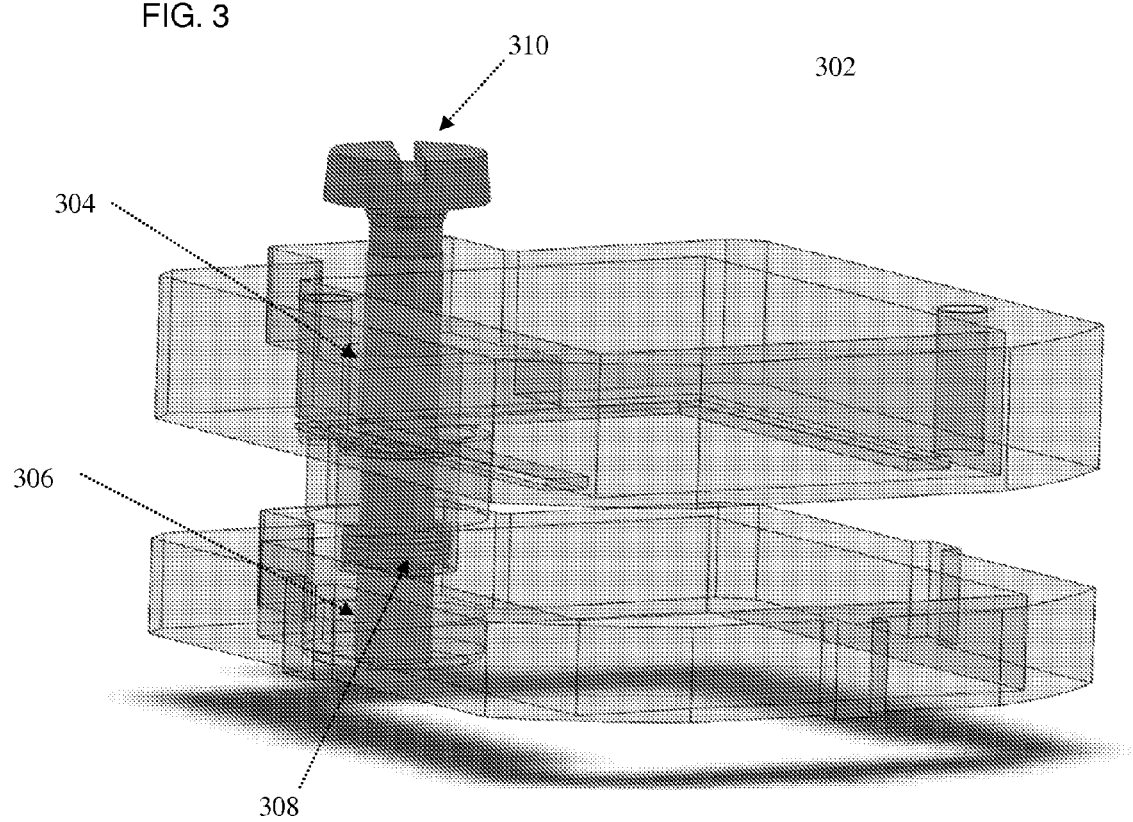
FIG. 3 shows a vertical adjusting mechanism adapted to move the image source in two different directions.
Figure 4:
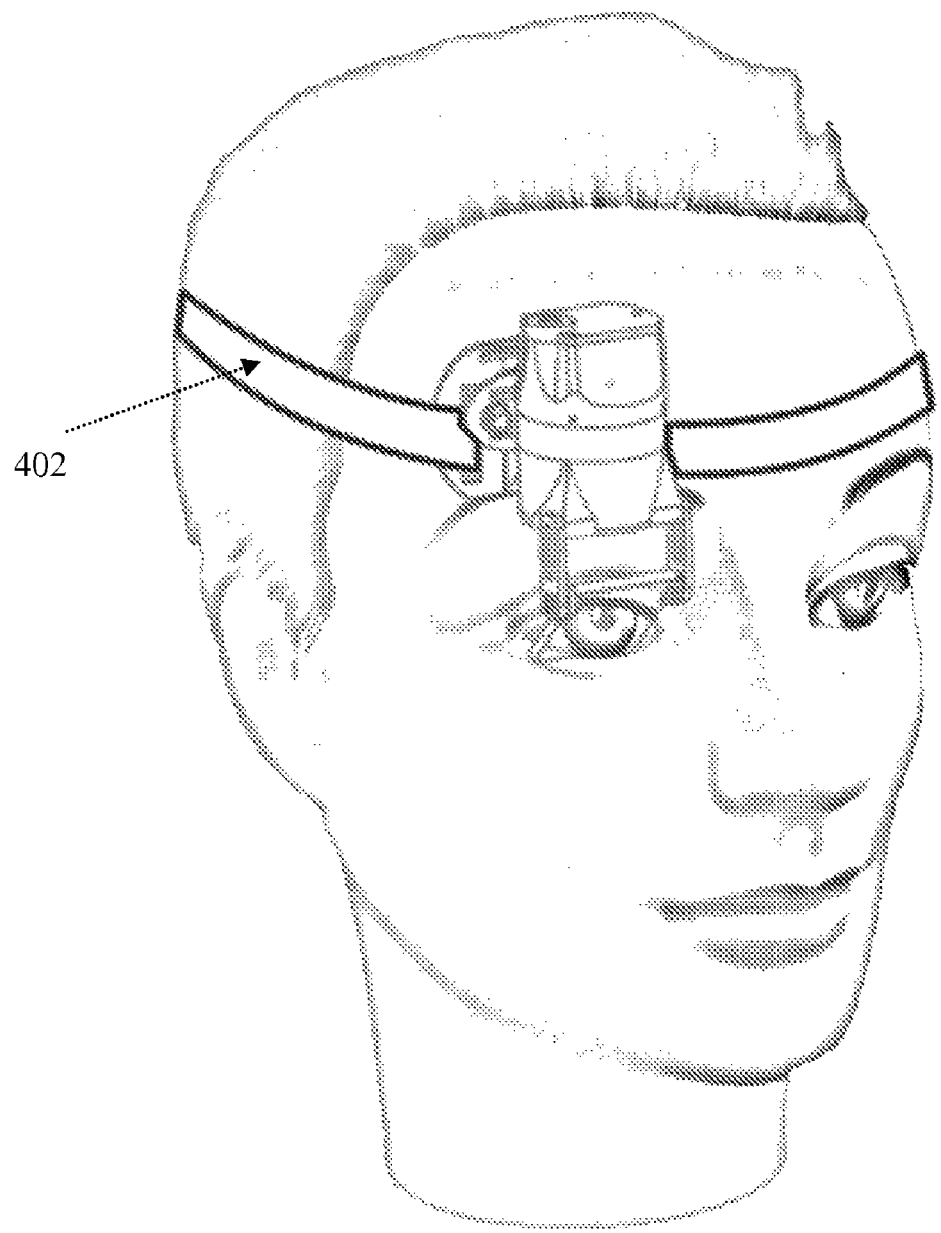
FIG. 4 shows an image display device according to the disclosed subject matter with the head mounted support.

FIG. 3 shows a vertical adjusting mechanism 302 adapted to move the image source 102 in two different directions, generally up and down. The vertical adjusting mechanism 302 comprises a first pillar 304, mechanically connected to the image source 102, with longitudinal surface walls sliding inside a hollow section of a second pillar 306 and containing a spring 308 in between. The first and second pillars 304, 306 have a longitudinal opening to receive a screw 310, and additionally the first pillar 304 comprises a thread. The screw 310 longitudinally crosses the first pillar 304, the spring 308 and the second pillar 306, and it is screwed at the thread of the first pillar 304, thus moving up or down the image source 102 because it is mechanically connected to the first pillar 304. The first and second pillars 306, 308 may be replaced by another adjusting mechanism, such as a worm gear. In some cases, the HMD may be produced without the vertical adjusting mechanism 302 and the opening on the cap 212 part.

By changing the image source 102 position within the housing 116 it is possible to slightly adjust the size (field-of-view) of the projected image in front of the eyes according to the user's wish. Additionally, the mechanism also serves to precisely focus the projected image. For instance, the user can project the virtual image in the near eye sight if he or she is focused in a closer background or in the longer eye sight if he or she is focused in a distant background.

In a central region of the housing 116 there is a central part 210 in the periphery of the housing 116 perpendicular to the main optical path that has an attaching mechanism comprising a male/female pair connector to connect the housing 116 to a head mounted support 402. The male part of the connector can be integrally formed with the central part 210 and the female part with the head mounted support 402 or vice-versa. There are several configurations of male/female pair connectors available, depending on the type of the head mounted support that is intended to be used. The male/female pair connectors do not necessarily have to be in this central part 210, but may be in any other convenient zone of the housing 116. The central part 210 also comprises a rotating mechanism 214 to allow the housing 116 plus the beam splitter 104 to rotate around the main optical path 110 axis in order to compensate the head forefront inclination of different users. The rotation around the main optical path 110 axis can be done in two opposite directions allowing the image display device to be used in the left or right eye of the user. As an alternative this central part 210 may be suppressed and the male/female pair connector assumes a spherical configuration adapted to provide an equivalent rotation (consequently the same head forefront compensation) and additionally other degrees of freedom.

The head mounted support 402 can be a headband, helmet, hat, spectacles, goggles, or any other. For some particular applications the image display device comprises the head mounted support 402, the housing 116, plus a battery pack (not shown), a video camera (not shown), a sensor positioning unit (not shown), as well as a small microprocessor board (not shown) to enable wireless communication and voice recognition.

The housing 116 constitutes a strong shield protection of the enclosed image source, its driver electronics board 118 and achromatic doublet lenses 106, 108 from environmental corrosive particles or against shock caused by falling or impact with foreign objects. The housing 116 is sealed on the bottom part by the second achromatic doublet lens 108 which is fixed by press fit to the housing 116, or by other mechanical fixation means.

In the preferred embodiment, the housing 116 is manufactured using a light and sturdy material which can be a metal (like aluminum), metal alloy or plastic (like epoxy, acrylic, high temperature polymers and others). The housing 116 can be produced using injection molding, stereolithography, SLS, Polyjet and other manufacturing methods.

The housing 116 has a simple and very efficient design to avoid "noise" in the projected image resulting from internal reflections. Therefore, preferably, the internal part of the housing 116, such as the internal wall, at least partially includes a light dispersive surface, e.g. extending from the image source to the first achromatic lens configured to avoid having the internal reflections reach the entrance pupil 112. The internal wall of the housing is also coated with an anti-reflective and/or absorbent material (e.g. black paint, etc.) which, in combination with the dispersive wall, eliminates the undesired internal light reflections and consequently reduces the stray light to a minimum (increasing the signal-to-noise ratio). The internal reflections are not redirected to the projection optics (achromatic lenses), and therefore they do not reach the beam splitter 104 and subsequently do not influence the image seen by the user.

Depending on the type of image source used it might be advantageous to have a housing configuration that contributes to dissipate the amount of heat generated by the image source through a cooling system designed in the housing 116. In the preferred iteration of this embodiment, a passive cooling system would be employed, however, an active cooling system is also possible. Referring to the passive cooling system, the system could comprise small openings for a hot air flow on the rear wall side of the housing and above the image source level. This means that after several hours of using the image display device, the user will not complain of a warming area around the head, which would otherwise cause discomfort and difficulties using the device. This is another important feature, as other prior HMDs products (e.g. Nomad™ HMD) were discontinued because of this warming effect. Since the preferred image source type used (OLED) produces a negligible amount of heat, a cooling system is normally not required in this situation.

In the preferred embodiment, from FIGS. 2A and 2B, the image display device comprises two mounting brackets 202, parallel to the main optical path 110 and parallel to the head forefront plane, mechanically connecting the beam splitter 104 to the housing 116. One is on the left side of the housing 116 and the other one on the right side (see FIG. 2A). Each mounting bracket has a first pivotal mechanism 206 in one end and a second pivotal mechanism 208 in another end. The first pivotal mechanism 206 is attached to the bottom of the housing 116 and the second pivotal mechanism 208 is attached to the beam splitter 104 by means of a clamp holding two of its edges, i.e., the left and right side edges. The first and second pivotal mechanisms 206 and 208 allow the beam splitter to rotate in two axes perpendicular to the main optical path and parallel to the head forefront plane providing two degrees of freedom, therefore allowing the user to adjust the eye relief, as well as to position the virtual image in an upper or lower area of the user field-of-view. On one side, the first pivotal mechanism 206 allows the rotation of the beam splitter 104 (similar to a pendulum movement) to assure sufficient space to use eye correction glasses, in opposition to HMDs using eye-glass form. On the other side, the second pivotal mechanism 208 allows the beam splitter 104 to rotate, within a certain acceptance angle range (preferably around 45°), providing the user the freedom to move the virtual image above, below or in front of the user's horizontal line-of-sight. Optionally, the image display device comprises at least one mounting bracket, preferably two, if the same technical effects and robustness are guaranteed. Other mechanical fixation means can be used instead of the mounting brackets. Moreover, the beam splitter 104 could be placed in the frame of regular glasses if it is aligned with the main optical path 110 and if it has a rotating mechanism 214 that provide the same functionality or effect of the first and second pivotal mechanisms 206 and 208.

The mounting brackets 202 and 204 also have a longitudinal slot to descend or to ascend the beam splitter 104 position relative to the user's horizontal line-of-sight. This longitudinal slot in the mounting brackets provides a third degree of freedom to the beam splitter. This combination of movements (3 degrees of freedom) provided to the beam splitter allows a very intuitive and quick adjustment of the image into the entrance pupil 112, as well as an easy adaptation of the image display device to any user head anatomy. This longitudinal slot is optional according to the intended use of the image display device.

The beam splitter 104 is the last optical element in front of the user's eye and is preferentially placed at 45° to the main optical path and is located below the bottom of the housing 116. The beam splitter 104 may assume different geometric configurations, preferable a plate beam splitter having a preferable thickness of circa 3 mm, or alternatively a curved, prism, or square beam splitter. Depending on its configuration the beam splitter may be held by other mechanical means, rather than the clamp, as long as it is guaranteed a solid fixation point. The beam splitter 104 is easily handled and manually removable from its clamp. The beam splitter can be quickly replaced by the user by a new beam splitter in case of damage or mistreatment, as well as, by another beam splitter 104 offering different optical image reflectivity coefficient when used in different environment light conditions, such as outdoor (strong daylight luminance) or indoor. In order to further improve the image contrast, the image display device comprises two buttons to increase or decrease the brightness according to the light conditions. In the preferred configuration the beam splitter 104 has a 70% reflectivity/30% transmission coefficient in the visible spectrum of the light (400 nm to 700 nm) which represents the capacity to collect 70% of the maximum luminance available from the image source that goes into the entrance pupil 112 of the human eye (however others could be utilized to suit the particular user or environment of deployment). For this reflectivity coefficient, the image projected into the user's eye has a luminance of around 300 cd/m2 for a maximum 400 cd/m$^2$ luminance provided by the image source. Another advantage is that if 300 cd/m2 is not enough for outdoor environment then the beam splitter 104 can be rapidly replaced with a more suitable beam splitter 104 (e.g. 80%/20%) in few seconds. Preferably, the beam splitter 104 reflectivity coefficient may be chosen from a range between 45% to 99%, however, any reflectivity coefficient could be used.

The optical configuration of the image display device does not compromise the resolution of the image provided by the image source that reaches the user entrance pupil 112. The image seen by the user has the same definition as an image seen on a PC monitor having the same resolution.

The present disclosure uses a slim beam splitter 104 which is as imperceptible to the vision as the lens of eye correction glasses with no dioptric power (neutral lens), meaning no visual effort is required and headaches would not occur when wearing such device. Given the fact that the beam splitter 104 has no frames (compared to some prior art HMDs or normal opaque frame glasses) the see-through capability of the image display device is enhanced because, in addition to the percentage of the environment light transmitted through the beam splitter 104 to the human eye, there is an additional amount of light that also reaches the human eye which otherwise would be obstructed by opaque frames. Moreover, this image display device housing 116 doesn't block the passage of the environmental light or reduce the regular user field-of-view. The housing 116 is positioned in the region of the head out of that field-of-view.

Another benefit of this HMD is that the image source, beam splitter 104 and the achromatic doublet lenses 106, 108 are in an on-axis (main optical path) configuration, which provides a greater tolerance to optical misalignments, thus a much easier way to align the optics along the optical path is obtained. Another advantage is that this optical configuration does not comprise apertures, so there are no additional diffractions.

The image display device contains a driver electronics board 118, electrically connected to the image source, which can be placed inside the housing 116 without increasing its volume or outside the housing 116. The driver electronics board 118 receives the image signal from a peripheral equipment with specific interfaces, and is adapted to receive the electrical power (from a battery pack or other power source) and comprises input devices to control the brightness, contrast and flip of the image or other control functions, e.g. on/off dedicated button, image format, image size, color gamut, aspect ratio, frequency, etc.

The peripheral equipment can be a microprocessor fixed to the head mounted support 402 or a handheld device usually placed at the waist of the user, allowing hands-free use. The microprocessor receives computer generated objects via wired or, preferably, wireless connection, having embedded a voice recognition application adapted to select the image to be displayed at the image source. The wireless communication link can be a short range communication provided according to Bluetooth, Wi-Fi or other standards. The voice recognition application comprises a microphone or a head set to receive the vocal commands to be transmitted to the microprocessor. In the preferred embodiment, the microprocessor and the battery pack, which is also fixed to the head mounted support 402 and connected to the driver electronics board 118, constitute a complete wireless see-through Head-Mounted Display (HMD). This means that no wires will put at risk the user's safety in certain delicate operations, as it happens with current HMDs. This is a breakthrough product in this type of technology.

The handheld device can be of any type of handheld device, such as PDA, Pocket PC, smart phone, mobile phone, or similar. Instead of using a handheld device a kind of wireless pointer mouse (e.g. gyroscope mouse, wrist mouse) can be arranged to select an image to be displayed at the image source.

For certain purposes, the image display device may also be combined with an inertial measurement unit or a sensor positioning or an instrument used to measure the strength and direction of the magnetic field and/or a video camera, these units being fixed to the head mounted support 402.

In one alternative, the bottom part of the housing 116 has a coupling attaching mechanism adapted to receive a second housing with lenses therein to allow the image display device to work as a compact projector, providing two-in-one capabilities, thus making this image display device a singular one.

The foregoing description of the embodiments is provided to enable a person skilled in the art to make or use the claimed subject matter without undue experimentation. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

Although the disclosed subject matter has been described in detail, it should be understood that various changes, substitutions, and alterations can be made hereto without departing from the spirit and scope of the invention as defined by the appended claims.

What is claimed is:

1. An image display device comprising:
   a main optical path;
   a housing mountable to a person's head;
   an image source associated with the housing and oriented substantially perpendicular to the main optical path, the source adapted to be driven by a remote signal in order to generate an image that is transmitted along the main optical path;
   a beam splitter, positioned in the main optical path and oriented at an angle of approximately 45° such that a beam propagating along the main optical path is deviated over a substantially right angle and that the image generated by the image source is focused into the entrance pupil of a human eye of the person;
   at least one lens oriented substantially perpendicularly to the main optical path and placed between the image source and the beam splitter, and configured to amplify, collimate and correct optical aberrations of the said image,
   wherein the image source and the at least one lens are contained inside the housing,
   wherein the image source, the beam splitter, and the at least one lens are in an on-axis configuration, and
   wherein the device further comprises one or two mounting brackets positioned parallel to the main optical path and mechanically connecting the beam splitter to the housing, each of the one or two mounting brackets having a first pivotal mechanism at one end and a second pivotal mechanism at another end, the first pivotal mechanism being attached to the housing and the second pivotal mechanism being attached directly to the beam splitter.

2. The apparatus of claim 1, wherein the beam splitter is selected from the group consisting of plate beam, curved, prism and square beam splitter, and is located externally to the housing.

3. The apparatus of claim 1, wherein the second pivot mechanism is attached to the beam splitter by means of a clamp or other mechanical fixation means adapted to enable a sliding movement of the beam splitter.

4. The apparatus of claim 1, wherein the optical beam splitter has a 45% to 99% reflectivity coefficient.

5. The apparatus of claim 1, further comprising at least one achromatic doublet lens oriented substantially perpendicularly to the main optical path and placed between the image source and the beam splitter, and configured to amplify, collimate and correct optical aberrations of the said image.

6. The apparatus of claim 1, further comprising three or more lenses oriented substantially perpendicularly to the main optical path and placed between the image source and the beam splitter, and configured to amplify, collimate and correct optical aberrations of the said image.

7. The apparatus of claim 1, wherein, the one or two mounting brackets, through the first and second pivotal mechanism, are adapted to rotate the beam splitter in two degrees of freedom, each mounting bracket having a slot adapted to move the beam splitter in one of two opposite directions providing a third degree of freedom to the beam splitter.

8. The apparatus of claim 1, wherein the bottom part of the housing has a coupling attaching mechanism adapted to receive a second housing with lenses therein to make the image display device to work as a compact projector.

9. The apparatus of claim 1, further comprising a head mounted support, such as a headband, a helmet, spectacles, goggles or any other, mechanically connected to the housing through a male/female pair connector, which can assume different configurations depending on the intended use.

10. The apparatus of claim 1, wherein the housing comprises a rotating mechanism adapted to rotate the housing relatively to the head mounted support in two opposite directions and in an axis parallel to the main optical path allowing the compensation of the head forefront curvature when the device is used in the right or left user eye.

11. The apparatus of claim 1, wherein the housing is sealed at the top by a cap and at the bottom by a press fit of the second achromatic lens to the housing, wherein an internal wall of the housing is shaped as a light dispersive surface and at least partially coated with an anti-reflective material.

12. The apparatus of claim 1, wherein the housing comprises a longitudinal adjusting mechanism, parallel to the main optical axis, adapted to move the image source position in two opposite directions in order to adjust the size or field-of-view of the image projected in front of the user eyes.

13. The apparatus of claim 10, further comprising a microprocessor adapted to receive computer generated objects via wireless connection and/or wired electrical connection, having embedded therein a voice recognition application adapted to select the image to be displayed at the image source, the microprocessor being fixed to the head mounted support or to any part of the user's human body.

14. The apparatus of claim 10, further comprising an inertial measurement unit or a sensor positioning unit or a sensor to measure the direction of the magnetic field and/or a video camera, which can be fixed to the head mounted support.

15. The apparatus of claim 1, further comprising a kind of wireless mouse or a handheld device adapted to select the image to be displayed at the image source.

* * * * *